A. JOHNSON.
MEANS FOR CUTTING BASS STRING FELT DAMPERS.
APPLICATION FILED SEPT. 7, 1912. RENEWED APR. 8, 1914.

1,117,577.

Patented Nov. 17, 1914.
2 SHEETS—SHEET 1.

Witnesses:

Inventor
Albert Johnson
By his Attorney
H. C. Karlson

A. JOHNSON.
MEANS FOR CUTTING BASS STRING FELT DAMPERS.
APPLICATION FILED SEPT. 7, 1912. RENEWED APR. 8, 1914.
1,117,577.
Patented Nov. 17, 1914.
2 SHEETS—SHEET 2.
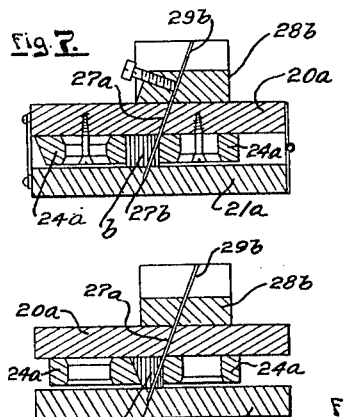
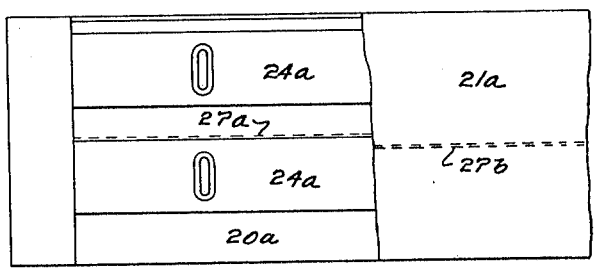
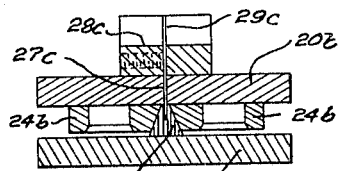
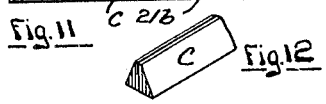
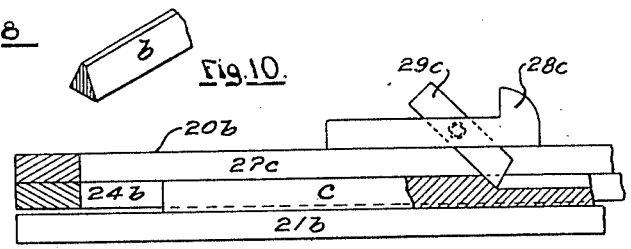
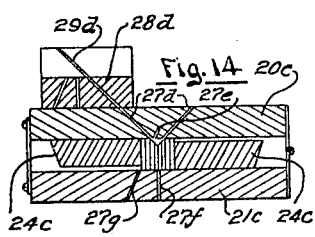
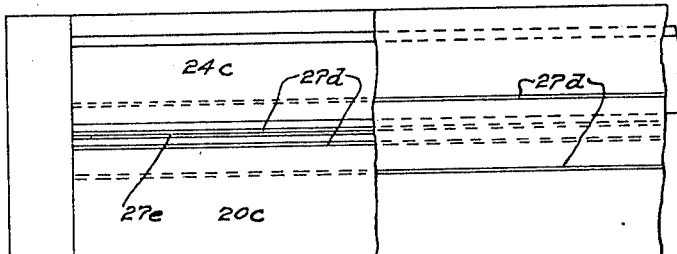
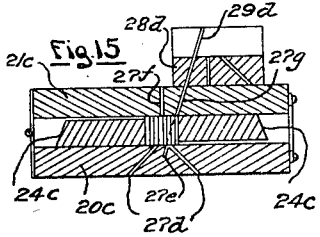
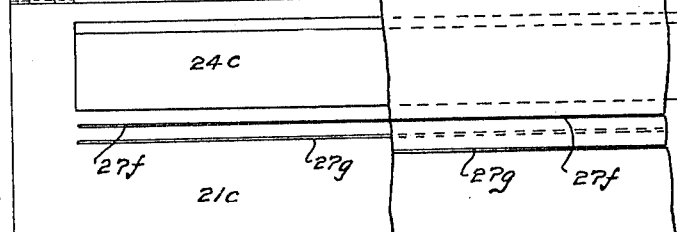
Inventor
Albert Johnson
By his Attorney
H. C. Karlson
Witnesses:
L. A. Nicholas.

UNITED STATES PATENT OFFICE.

ALBERT JOHNSON, OF NEW YORK, N. Y.

MEANS FOR CUTTING BASS-STRING FELT DAMPERS.

1,117,577. Specification of Letters Patent. Patented Nov. 17, 1914.

Application filed September 7, 1912, Serial No. 719,188. Renewed April 8, 1914. Serial No. 830,540.

*To all whom it may concern:*

Be it known that I, ALBERT JOHNSON, a citizen of the United States, and resident of the borough of Manhattan, in the county of New York and State of New York, have invented certain new and useful Improvements in the Means for Cutting Bass-String Felt Dampers, of which the following is a specification.

This invention relates to means for cutting felt strips or blocks such as are used in piano actions.

One of the objects of the invention is the production of a bass string damper of materially stronger construction than those in use heretofore.

Another object is to provide simple and convenient means for the rapid production of variously shaped blocks of the kind above mentioned.

Other objects and advantages will become apparent as the description proceeds.

With these objects in view the invention comprises certain novel constructions, parts and combinations of parts, hereinafter described and pointed out in the appended claims, reference being had to the annexed drawings, in which:—

Figure 1 is a fragmentary perspective view illustrating the relation which the strips or blocks that are cut from a felt sheet bear to the grain thereof. It will be understood that this is an imaginary view and does not represent an actual condition or stage in the manufacture. Fig. 2 is a cross-section of a device for cutting the V-groove in the strip illustrated by Fig. 6. Fig. 3 is a fragmentary top-plan view of Fig. 2. Fig. 4 is a fragmentary front view of Fig. 3. Fig. 5 is a fragmentary bottom plan view of Fig. 4. Fig. 6 is a fragmentary perspective view of a so-called "single wedge strip." Fig. 7 is a cross-section of a device for cutting the beveled sides of the strip illustrated by Fig. 10. Fig. 8 is a view similar to the preceding, parts being shown in changed positions. Fig. 9 is a fragmentary bottom-plan view of Fig. 8. Fig. 10 is a fragmentary perspective view of a so-called "double wedge strip." Fig. 11 is a cross-section of a device for cutting the center slit of the strip illustrated by Fig. 12. Fig. 12 is a fragmentary perspective view of a so-called "trichord wedge strip." Fig. 13 is a front view of Fig. 11, parts being shown in sections and other parts broken away. Fig. 14 is a cross-section of a universal device for cutting any or all of the strips shown. Fig. 15 is a view similar to the preceding, parts being shown in changed relation, and Fig. 16 is a fragmentary plan view of Fig. 14, parts being shown in changed positions.

In the present invention the felt sheet is first cut into strips. These strips are then placed and clamped in holders with their edge grain or severed sides presented to the knife. Then a suitable cutting tool is guided lengthwise of the strip, not across it or across the grain, to trim or shape it. As many longitudinal cuts are made as are necessary to give the desired shape. In end view or cross-section the strip now presents the shape of the finished blocks, which are produced by merely cutting the strip transversely into short lengths, these severing cuts being at right angles to the shaping cuts. This procedure is expeditious, and blocks made by it are far stronger than when done in the old way.

Fig. 10 shows a strip which when cut slantwise and lengthwise from both sides, forms a so-called "double wedge block strip," that is, slightly truncated triangular blocks.

Fig. 12 shows a "trichord wedge block strip," being similar to the last except that it has a vertical slit in the top.

The operations for producing the notch, beveled sides, and slit, will be referred to as "shaping" or "trimming."

The felt sheet is first divided by parallel cuts into rectangular strips having a width equal to the height of the blocks to be made.

Figure 1:
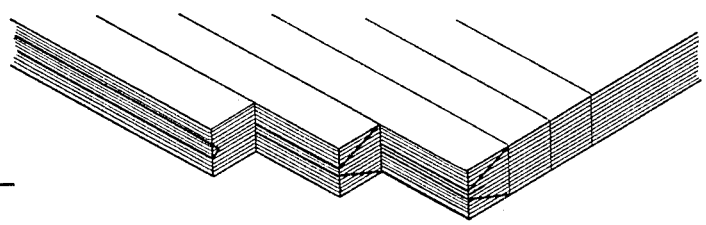
Figure 2:
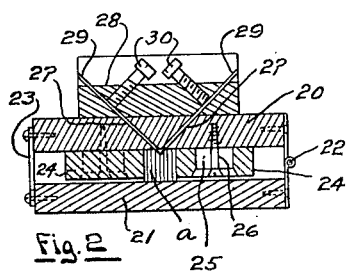
Figure 3:
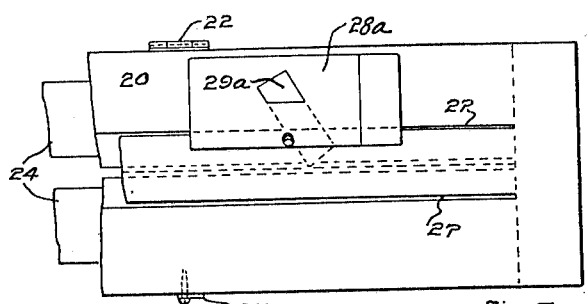
Figure 4:
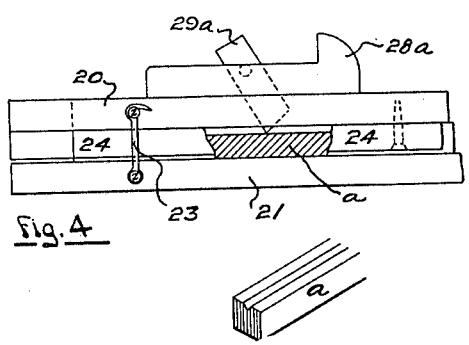
Figure 6:
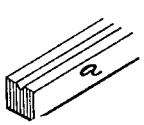
Fig. 6 shows a finished strip which when cut cross-wise into short lengths makes what are known as "single wedge blocks," that is to say, rectangular blocks each having a V-shaped notch at top.
Figure 5:
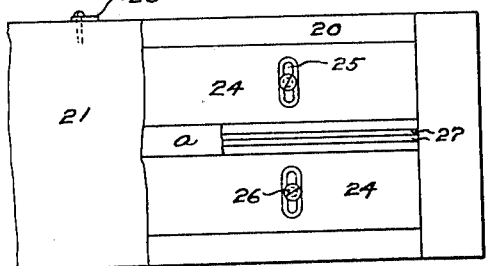

The strip for single wedge blocks is placed in the holder shown in Figs. 3, 4 and 5. It comprises elongated top and bottom members or plates 20 and 21, hinged together at longitudinal edges as shown at 22, and provided with locking means 23, which may be in the nature of hook catches, at their opposite edges. Side retainers or retaining members 24 are located between the aforesaid members 20, 21 and may be carried by the top plate member. Adjustment toward and from each other to accommodate strips of different widths is provided for by slots 25 which receive the screws 26. The strip *a* is held in the box or elongated chamber thus formed. The top plate 20 has longitudinal, downward convergent guide slots 27, properly located and at the required angle, so that a cutter blade or blades guided thereby will form the notch in the top of the strip characteristic of single wedge blocks. Fig. 2 shows a knife holder 28 slidable longitudinally on top of the member 20 and carrying two reversely inclined blades 29 set in convergent slots and held by set-screws 30. In this way both cuts to form the notch can be made simultaneously by moving the tool holder and knives longitudinally of the clamp. In Figs. 3 and 4 there is shown a single blade 29$^a$ held in a holder 28$^a$, thus necessitating two operations.

The apparatus shown by Figs. 7, 8 and 9 is in general similar to the preceding. Here the top member 20$^a$ has a single inclined guide slot 27$^a$, properly disposed to guide the blade 29$^b$ so as to bevel the side of the strip $b$. The blade 29$^b$ is held in the tool holder 28$^b$ at a corresponding angle. After one side of the strip is beveled, it is reversed and the other side is reversely beveled. Accordingly the side member 24$^a$ is reversible as well as adjustable, and is provided with one vertical face and one inclined face. Figs. 7 and 8 show its two positions. The bottom member 21$^a$ is provided with a guide groove 27$^b$ in its upper side to receive the end of the knife, which projects below the end of the strip.

Fig. 11 shows an apparatus similar to the last, except that its side members 24$^b$ both have reversely inclined inner sides, and its top member 20$^b$ has a vertical slot 27$^c$, with which coöperates a vertical knife 29$^c$ carried by a holder 28$^c$ so as to make the vertical slit in the top of the strip $c$. It will be understood that this strip may be shaped in the apparatus of Figs. 7—9, previous to insertion in the apparatus of Fig. 11 for slitting.

The apparatus of Figs. 14 to 16 is capable of performing any and all of these operations. The top member 20$^c$ has slots 27$^d$, like the slots 27 of Figs. 2 and 3, and a slot 27$^e$ like the clearance slot 27$^b$ in the bottom member 21$^c$ of Figs. 7–9. The bottom member 21$^c$ has a vertical slot 27$^f$ like the slot 27$^c$ in the top member 20$^b$ in Figs. 11 and 13, and an inclined slot 27$^g$ like the slot 27$^a$ in the top member of Figs. 7–9. The cutter holder 28$^d$ has a plurality of slots at different angles to hold the knife 29$^d$ so as to coöperate with any of the guide slots in the clamp. Either or both of the side members 24$^c$ are reversible by the same means as before, and each has one vertical and one inclined side face.

In each instance it will be observed, that the strips are placed in the holder so that an edge grain side is presented to the trimming or shaping tool and so that the layers or fibers of which the strip is composed are perpendicular to the base.

Having described my invention, what I desire to secure by Letters Patent and claim is:—

1. Means for shaping felt strips, comprising a holding device having members to engage all four faces of the strip, one of said members having a longitudinal guiding slot, in combination with a knife adapted to be guided by said slot to operate on the strip.

2. Means for shaping felt strips, comprising a box to confine the strip having side members adjustable toward and from each other, between and within the top and bottom members and a cutter guided longitudinally on the box to operate on the strip confined therein.

3. A device for shaping felt strips, comprising means for clamping the strip in all directions and guiding a cutter blade longitudinally of the strip, and a cutter adapted to be guided thereby.

4. Means for shaping felt strips, comprising a clamping device adapted to hold a felt strip longitudinally and transversely and having a longitudinal cutter blade guiding slot, in combination with a cutter adapted to be guided thereby.

5. Means for shaping felt strips, comprising an elongated member, side retainers for the strip located at one side of said member, and a cutter guided for longitudinal movement by the member.

6. Means for shaping felt strips, comprising a holder for confining the strip on its top, bottom and side faces and having a longitudinal guide slot, and a cutter movable longitudinally on said holder and having a knife blade which projects through said slot to operate on the strip in the holder.

7. Means for shaping felt strips, comprising a clamp composed of elongated members adapted to hold the strip between them, side retainers mounted in the clamp and between said members, and a longitudinally movable cutter.

8. Means for shaping felt strips, comprising a clamp having two elongated hinged members, means for locking them together with a strip held between, side retainers inside the clamp, and a cutter adapted to operate longitudinally on the strip held by the clamp.

9. Means for shaping felt strips, including top and bottom clamp members, one of which is provided with a longitudinal inclined knife guiding slot, and side members, one of which is reversible and has a vertical face and an inclined face and a knife operating in said slot.

10. Apparatus for shaping felt strips, comprising means for holding the same longitudinally and having converging longitudinal slots, and a cutter having a blade adapted to operate in either of said slots so as to cut a notch in the strip.

11. Apparatus for shaping felt strips, comprising a holder for confining the strip lengthwise and means affording a guide to guide a knife blade longitudinally of the strip and at such angle and location as to bevel the side of the strip.

12. Apparatus for shaping felt strips, comprising, in combination, a holder having top and bottom members provided with longitudinal guide slots at various angles, and reversible side members each having a perpendicular and an inclined side face, and a knife adapted to operate in said slots.

13. Means for shaping felt strips, comprising a holder affording an elongated chamber to confine the strip and having side members one of which is reversible and has its two side faces in angular relation, and a knife adapted to project into said chamber and to operate longitudinally thereof.

14. Apparatus for shaping felt strips, comprising a clamp for holding the strip longitudinally, side retainers having reversely inclined faces, said clamp having a longitudinal slot in one of its members perpendicular to the base of the strip held by the clamp, and a cutter guided on said clamp having a blade adapted to operate in said slot.

Signed at the borough of Manhattan, in the county of New York and State of New York, this 4th day of September, A. D. 1912.

ALBERT JOHNSON.

Witnesses:
H. C. KARLSON,
W. H. GEE.

Copies of this patent may be obtained for five cents each, by addressing the "Commissioner of Patents, Washington, D. C."